United States Patent
Wang

(10) Patent No.: US 7,945,997 B2
(45) Date of Patent: May 24, 2011

(54) MAGNETIC HINGE ASSEMBLY

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 315 days.

(21) Appl. No.: 12/354,103

(22) Filed: Jan. 15, 2009

(65) Prior Publication Data
US 2010/0071157 A1 Mar. 25, 2010

(30) Foreign Application Priority Data
Sep. 25, 2008 (CN) .......................... 2008 1 0304668

(51) Int. Cl.
*E05D 11/10* (2006.01)
(52) U.S. Cl. ................... 16/320; 16/340; 16/337
(58) Field of Classification Search .................. 16/320, 16/385, 386, 342, 337, 338, 340, DIG. 14; 292/251.5, 288, 338, 339, 342, 343, DIG. 17; 455/550.1, 557.1, 575.3; 379/433.13
See application file for complete search history.

(56) References Cited

U.S. PATENT DOCUMENTS

| | | | |
|---|---|---|---|
| 3,287,760 A * | 11/1966 | Moore | 16/265 |
| 6,408,484 B1 * | 6/2002 | Vandertouw | 16/320 |
| 2002/0147026 A1 * | 10/2002 | Hsieh | 455/550 |
| 2003/0154571 A1 * | 8/2003 | Hsiang et al. | 16/320 |
| 2003/0179880 A1 * | 9/2003 | Pan et al. | 379/433.13 |
| 2004/0134030 A1 * | 7/2004 | Seidler | 16/320 |
| 2007/0077972 A1 * | 4/2007 | Tu et al. | 455/575.3 |
| 2007/0157432 A1 * | 7/2007 | Weinstein | 16/320 |
| 2009/0167472 A1 * | 7/2009 | Lu | 335/287 |

FOREIGN PATENT DOCUMENTS

JP 2006112523 A * 4/2006

* cited by examiner

*Primary Examiner* — Chuck Y. Mah
(74) *Attorney, Agent, or Firm* — Clifford O. Chi

(57) ABSTRACT

A hinge assembly includes a pivot shaft, a rotatable leaf rotatably sleeved on the pivot shaft, a fixing leaf non-rotatably sleeved on the pivot shaft, a first magnet fixed to the rotatable leaf, a second magnet fixed to the fixing leaf, and a fixing member. A polarity of the second magnet faces an opposite polarity of the first magnet in a predetermined position such that the first and second magnets experience attraction. The attraction is changeable when the rotatable leaf is rotated relative to the fixing leaf. The fixing member is fixed at an end of pivot shaft to prevent the rotatable leaf and the fixing leaf from detaching from the pivot shaft.

20 Claims, 4 Drawing Sheets

MAGNETIC HINGE ASSEMBLY

CROSS-REFERENCE TO A RELATED APPLICATION

This application is related to a co-pending U.S. patent application, application Ser. No. 12/347533 filed on Dec. 31, 2008, entitled "MAGNETIC HINGE ASSEMBLY", wherein the inventor is Jin-Xin Wang. Such application has the same assignee as the present application. The disclosure of the above identified application is incorporated herein by reference.

BACKGROUND

1. Field of the Invention

The present disclosure generally relates to hinge assemblies and, particularly, to a magnetic hinge assembly used in a foldable electronic device having a top cover and a main body.

2. Description of the Related Art

Collapsible electronic devices, such as notebook computers, are popular for their portability. In the collapsible electronic device, a cover is hinged with a main body via a hinge assembly. A typical hinge assembly may be magnetic.

The typical magnetic hinge assembly includes a housing fixed in the main body, a pivot shaft fixed to the cover, a first magnet, and a movable second magnet. The housing defines a chamber. The pivot shaft is rotatably received in the chamber. The first magnet is fixed in the chamber. The second magnet is rotatably received in the chamber and sleeved on the pivot shaft. A polarity of the second magnet faces an opposite polarity of the first magnet such that the first magnet attracts the first magnet. Thus, the typical hinge assembly includes two stable positions. In a first stable position, a first polarity of the second magnet faces a first side of the first magnet, and the first side has a polarity opposite to the first polarity. In a second stable position, a second polarity of the second magnet faces a second side of the first magnet, and the second side has a polarity opposite to the second polarity.

To achieve a desired viewing angle of a display positioned in the cover, the cover generally needs to be opened to any angle relative to the main body, and remain in any position. However, the typical hinge assembly only includes two stable positions, so the cover only can be opened to two stable positions relative to the main body, and cannot remain in any other position.

Therefore, a magnetic hinge assembly is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

The present magnetic hinge assembly may be used in collapsible electronic devices, such as notebook computers, mobile phones, media players, and others.

Figure 1:
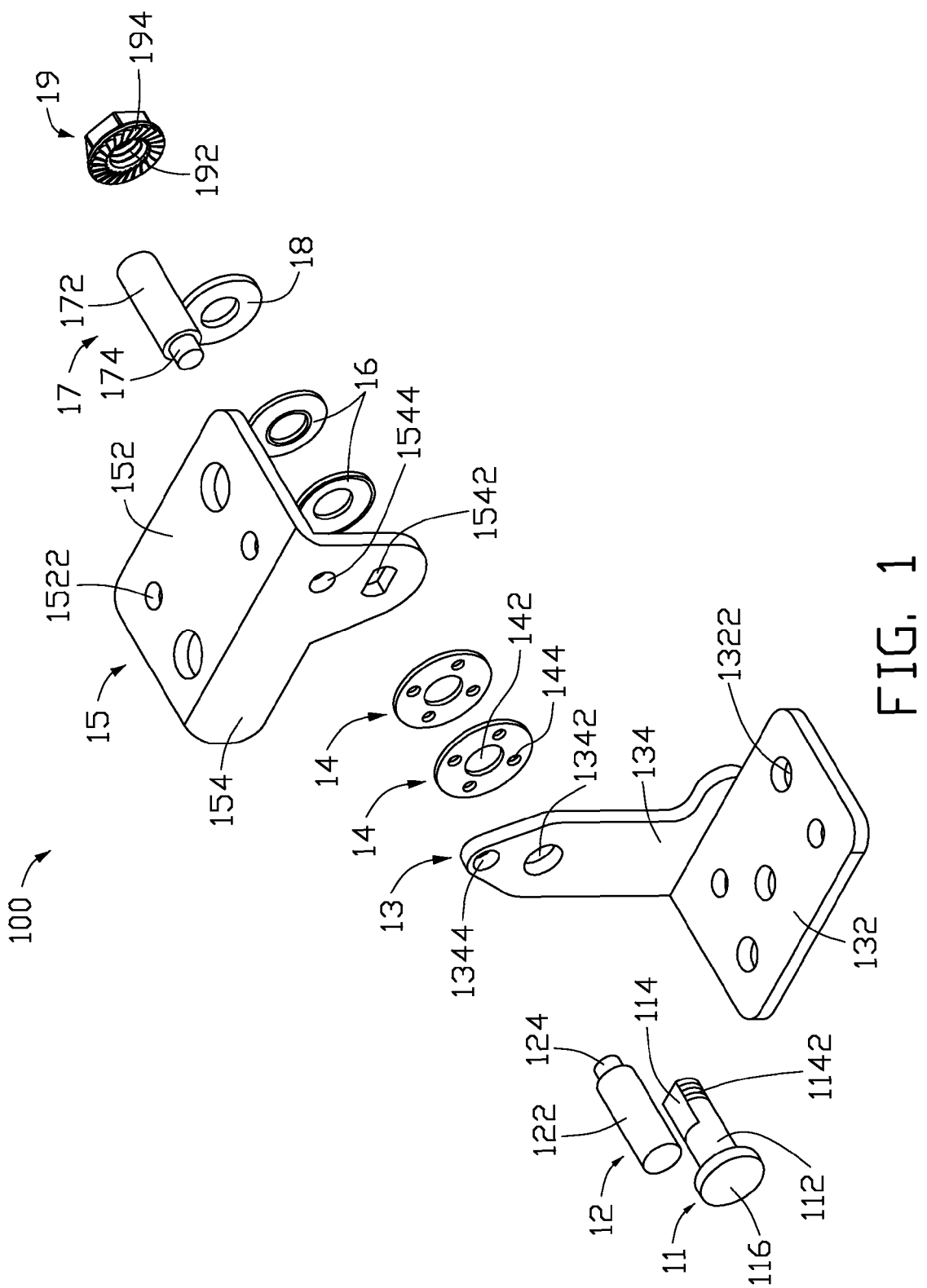
FIG. 1 is an exploded, isometric view of a first embodiment of a magnetic hinge assembly.
Figure 2:
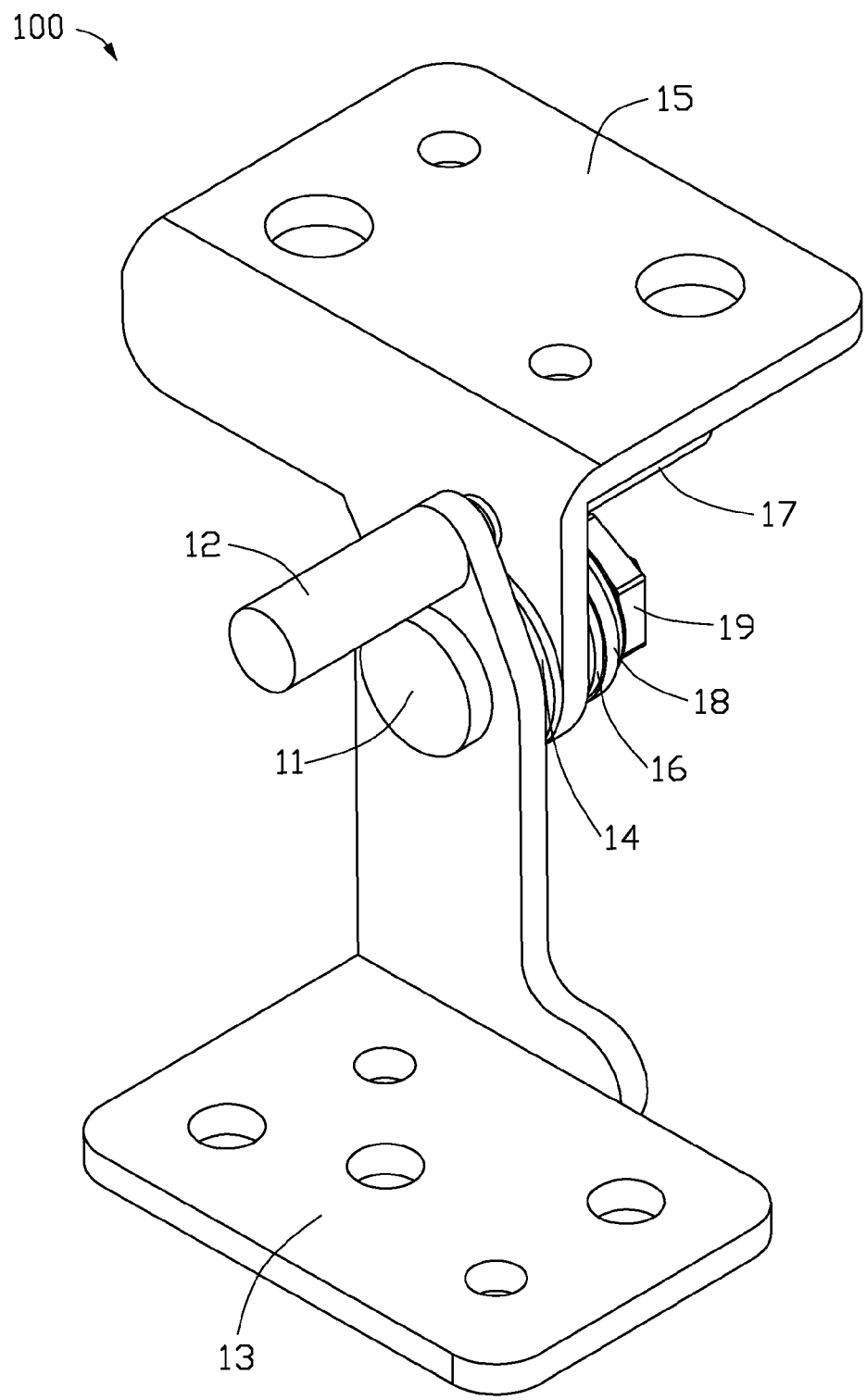
FIG. 2 is an assembled, isometric view of the magnetic hinge assembly of FIG. 1.

Referring to FIGS. 1 and 2, a first embodiment of a magnetic hinge assembly 100 includes a pivot shaft 11, a first magnet 12, a rotatable leaf 13, two friction members 14, a fixing leaf 15, a pair of resilient members 16, a second magnet 17, a washer 18, and a fastening member 19. The first magnet 12 is fixed to the rotatable leaf 13. The second magnet 17 is fixed to the fixing leaf 15. The rotatable leaf 13, the friction members 14, the resilient members 16, and the washer 18 are sleeved on the pivot shaft 11. The fixing leaf 15 is non-rotatably sleeved on the pivot shaft 11. The rotatable leaf 13, the friction members 14, and the resilient members 16 are rotatable relative to the pivot shaft 11. The friction members 14 are positioned between the rotatable leaf 13 and the fixing leaf 15. The fastening member 19 is fixed on an end of the pivot shaft 11, and abuts the washer 18.

The pivot shaft 11 includes a substantially cylindrical shaft portion 112, a limiting portion 114 extending from a first end of the shaft portion, a flange portion 116 extending from a second end of the shaft portion opposite to the first end. A cross-section of the limiting portion 114 taken along a plane perpendicular to an axial direction of the limiting portion 114 is non-circular, that is, rectangular, triangular, polygonal, or elliptical. A threaded portion 1142 is formed on a distal end of the limiting portion 114 away from the flange portion 1 16. The flange portion 116 is cylindrical in shape and has a diameter exceeding a diameter of the shaft portion 112.

The first magnet 12 includes a substantially cylindrical base portion 122 and a substantially cylindrical fixing portion 124 extending from an end thereof A diameter of the fixing portion 124 is less than a diameter of the base portion 122. The first magnet 12 may be a permanent magnet or an electromagnet. In the illustrated embodiment, the first magnet 12 is a permanent magnet, and an end of the fixing portion 124 away from the base portion 122 has a south polarity.

The rotatable leaf 13 includes a mounting portion 132 and a supporting portion 134 extending substantially perpendicularly from a side of the mounting portion 132. The mounting portion 132 defines a plurality of mounting holes 1322 to fix the rotatable leaf 13 to a cover (not shown) of a collapsible electronic device. The supporting portion 134 defines a pivot hole 1342 and a fixing hole 1344 in a middle portion of an end away from the mounting portion 132. The fixing hole 1344 is adjacent to the pivot hole 1342. The pivot hole 1342 is substantially circular such that a portion of the pivot shaft 11 rotatably engages in the pivot hole 1342. The fixing hole 1344 is also substantially circular and tightly engages the fixing portion 124 of the first magnet 12.

Each friction member 14 is substantially annular and defines a circular through hole 142 in a central portion and a plurality of evenly spaced lubricant holes 144 around the through hole 142. The through hole 142 engages the pivot shaft 11 and the lubricant holes 144 can receive lubricants.

The fixing leaf 15 includes a mounting portion 152 and a connecting plate 154 extending substantially perpendicularly from a side of the mounting portion 152. The mounting portion 152 defines a plurality of mounting holes 1522 to fix the rotatable leaf 15 to a main body (not shown) of the collapsible electronic device. The connecting plate 154 defines a deformed hole 1542 and a fixing hole 1544 in a middle portion of an end away from the mounting portion 152. The fixing hole 1544 is adjacent to the pivot hole 1542. The deformed hole 1542 is non-circular, that is, rectangular, triangular, polygonal, or elliptical, such that a portion of the pivot shaft 11 non-rotatably engages in the deformed hole 1542. The fixing hole 1544 is substantially circular and tightly engages a portion of the second magnet 17.

The resilient members 16 are substantially annular. A middle portion of each resilient member 16 protrudes toward one side thereof. The resilient members 16 are sleeved on the pivot shaft 11 and provide an axial force. It should be appreciated that the resilient members 16 may be substituted by a compression spring.

The second magnet 17 includes a substantially cylindrical base portion 172 and a substantially cylindrical fixing portion 174 extending from an end of the base portion 172. A diameter of the fixing portion 174 is less than a diameter of the base portion 172. The second magnet 172 may be a permanent magnet or an electromagnet. In the illustrated embodiment, the second magnet 172 is a permanent magnet, and an end of the fixing portion 174 away from the base portion 172 has a north polarity. It should be appreciated that the end of the fixing portion 174 may have a south polarity and the end of the fixing portion 124 of first magnet 12 may have a north polarity. However, a polarity on the end of the fixing portion 174 should be different from a polarity of the fixing portion 124 of first magnet 12.

The washer 18 is substantially annular defining a circular through hole (not labeled) in a central portion.

The fastening member 19 may be a nut defining a threaded hole 192 to engage the threaded portion 1142 of the pivot shaft 11. The fastening member 19 includes a friction portion 194 to abut the washer 18, thereby preventing the washer 18 from loosening on the pivot shaft 12. The friction portion 194 is formed by a plurality of friction protrusions (not labeled) extending from an end surface of the fastening member 19.

Referring to FIGS. 1 and 2, the fixing portion 124 of the first magnet 12 is inserted into the fixing hole 1344 of the rotatable leaf 13 and the fixing portion 174 of the second magnet 17 is inserted into the fixing hole 1544 of the fixing leaf 15, thereby fixing the first magnet 12 and the second magnet 17 to the rotatable leaf 13 and the fixing leaf 15. The rotatable leaf 13, the friction member 14, the fixing leaf 15, the resilient members 16, the washer 18 are sleeved on the pivot shaft 11 in that order. Finally, the fastening member 19 is threaded on the threaded portion 1142 of the pivot shaft 11, with the friction portion 194 abutting the washer 18.

Figure 3:
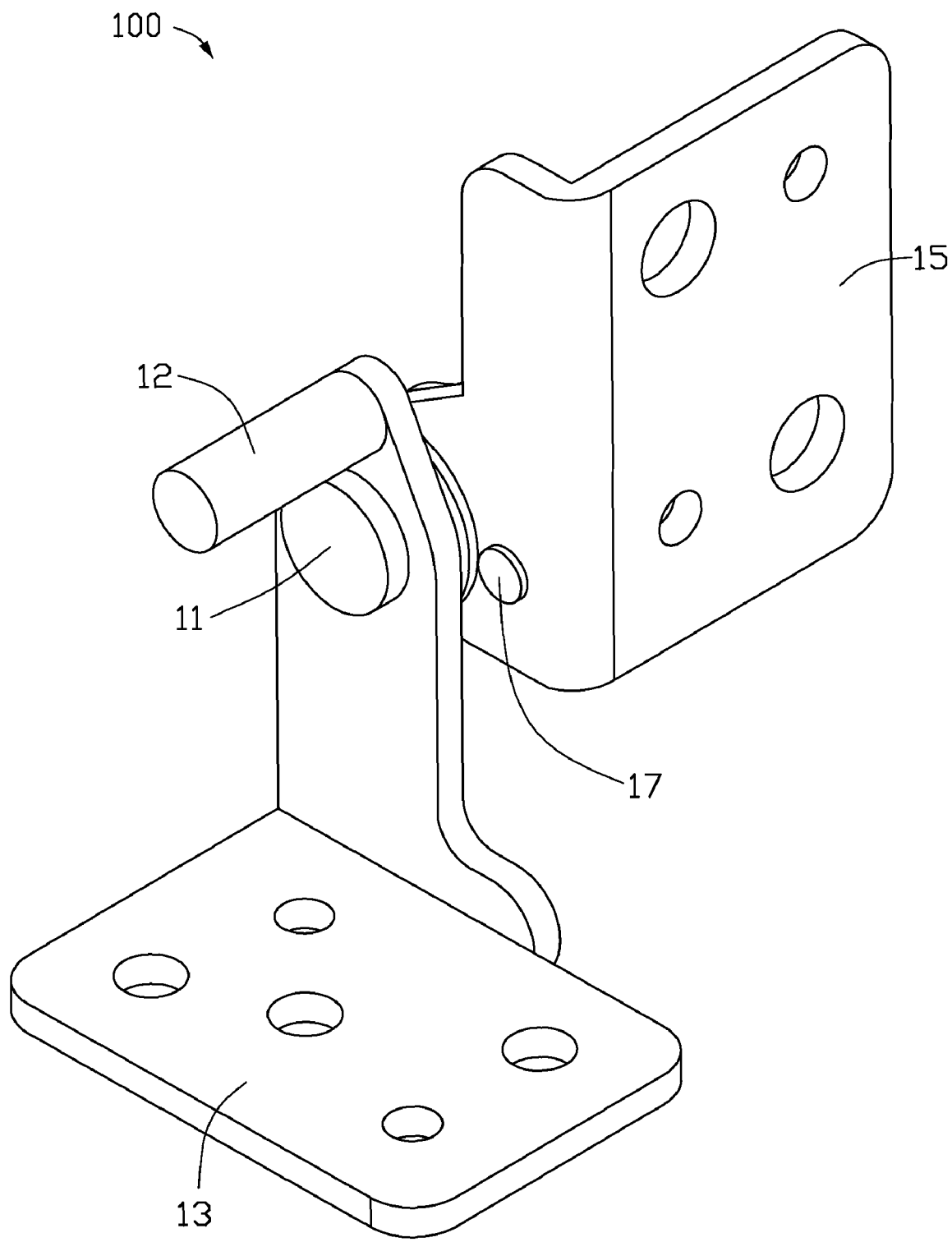
FIG. 3 is similar to FIG. 2, but shows a rotated state of the hinge assembly of FIG. 1.

Referring to FIGS. 1 through 3, when the magnetic hinge assembly 100 is in a locked state, the fixing portion 124 of the first magnet 12 and the fixing portion 174 of the second magnet 17 are aligned along substantially a same axis, such that maximal attraction is created between the fixing portion 124 of the first magnet 12 and the fixing portion 174 of the second magnet 17. In the locked state, the rotatable leaf 13 cannot rotate relative to the fixing leaf 15 without external force. When external force is applied to rotate the rotatable leaf 13 along a first direction to an open state, the central axis of the first magnet 12 gradually departs from the central axis of the second magnet 17. When the rotatable leaf 13 is rotated along the first direction to a predetermined position, a moment of force relative to the pivot shaft 11 created by a friction among the rotatable leaf 13, the friction members 14 and the fixing leaf 15 is equal to a moment of force relative to the pivot shaft 11 created by attraction between the fixing portion 124 of the first magnet 12 and the fixing portion 174 of the second magnet 17. Immediately after the rotatable leaf 13 passes the predetermined position, the moment of force relative to the pivot shaft 11 created by the attraction cannot overcome the moment of force relative to the pivot shaft 11 created by the friction. Thus, if the external force is released, the rotatable leaf 13 can remain in any position immediately after the rotatable leaf 13 passes the predetermined position.

To return the rotatable leaf 13 from the open state to the locked state, the rotatable leaf 13 is rotated by external force along a second direction opposite to the first direction, the central axis of the first magnet 12 gradually nears the central axis of the second magnet 17. If the external force is released, the rotatable leaf 13 can remain in any position before the rotatable leaf 13 passes the predetermined position. However, after the rotatable leaf 13 passes the predetermined position, the moment of force relative to the pivot shaft 11 created by the attraction overcomes the moment of force relative to the pivot shaft 11 created by the friction, thus the rotatable leaf 13 rotates further to the locked state even if the external force is released.

In the magnetic hinge assembly 100, when the moment of force relative to the pivot shaft 11 created by the attraction cannot overcome the moment of force relative to the pivot shaft 11 created by the friction, the rotatable leaf 13 can be held in any position by the friction. When the magnetic hinge assembly 100 is applied to the electronic device, the moment of force created by gravity acting on the weight of the cover should be taken into account. Therefore, the moment of force relative to the pivot shaft 11 created by the attraction cannot overcome a resultant moment of force created by the friction and the gravity of the cover.

Figure 4:
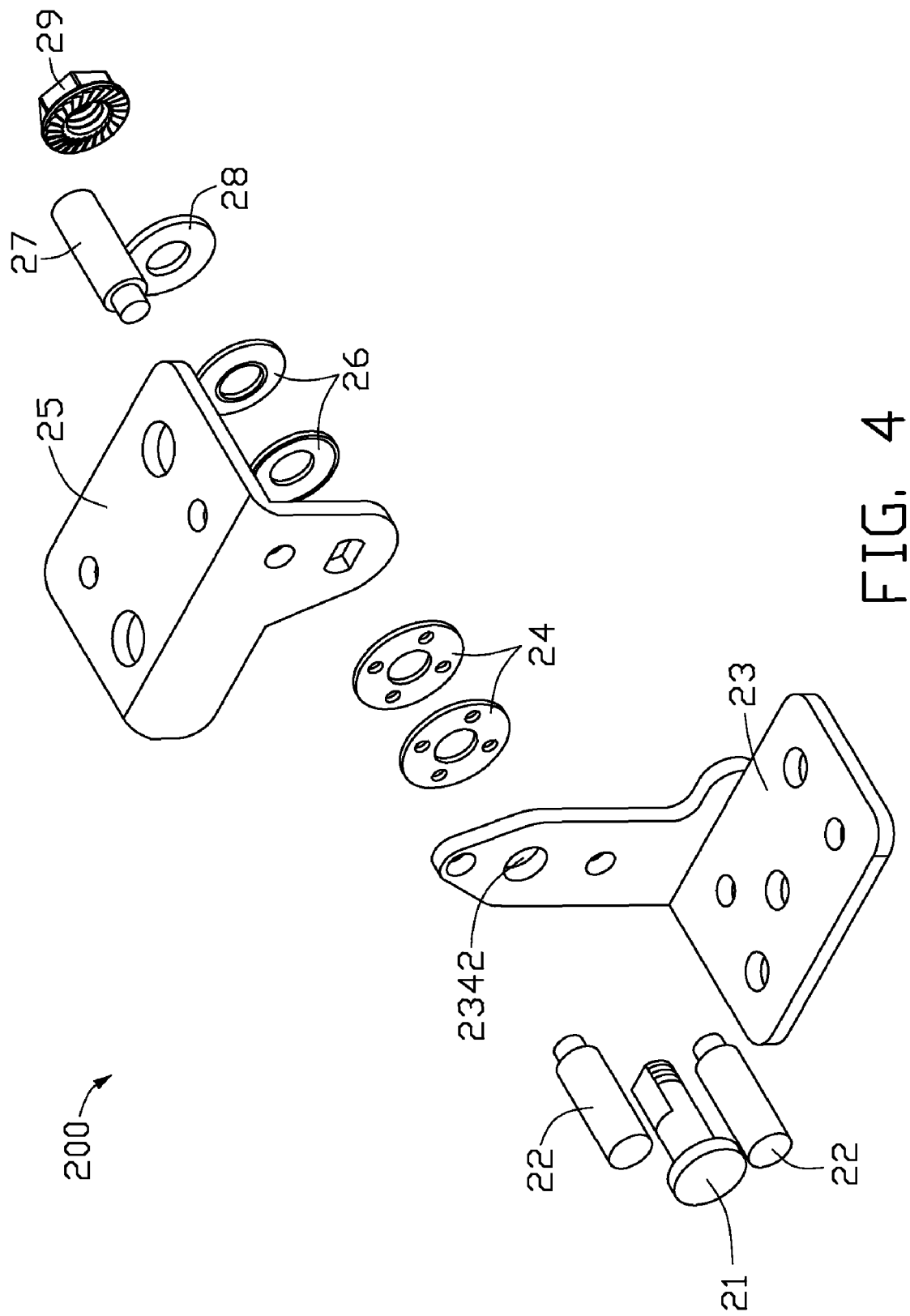
FIG. 4 is an exploded, isometric view of a second embodiment of a magnetic hinge assembly.

Referring to FIG. 4, a second embodiment of a magnetic hinge assembly 200 is similar in principle to the first embodiment of the magnetic hinge assembly 100. The magnetic hinge assembly 200 includes a pivot shaft 21, a first magnet 22, a rotatable leaf 23, two friction members 24, a fixing leaf 25, a pair of resilient members 26, a second magnet 27, a washer 28, and a fastening member 29. The first magnet 22 is fixed to the rotatable leaf 23. The second magnet 27 is fixed to the fixing leaf 25. The rotatable leaf 23, the friction members 24, the resilient members 26, and the washer 28 are sleeved on the pivot shaft 21. The rotatable leaf 23 includes a supporting portion (not labeled) defining a pivot hole 2342. However, the magnetic hinge assembly 200 includes two first magnets 22. The first magnets 22 are symmetrically fixed to the supporting portion adjacent to the pivot hole 2342. A fixing portion (not labeled) of the second magnet 27 may face a fixing portion (not labeled) of either one of the first magnets 22 when the magnetic hinge assembly 200 is in a locked state, thus the magnetic hinge assembly 200 includes two locked states.

It should be appreciated that a number of the first magnets 12, 22 or the second magnets 17, 27 is not limited to one or two, and may be three or more. The fixing portions of the first magnets 12, 22 and the second magnets 17, 27 may be threaded, and the fixing holes 1344, 1544 are threaded holes to engage the fixing portions, thus fixing the first magnets 12, 22 to the rotatable leaves 13, 23 and fixing the second magnets 17, 27 to the fixing leaves 15, 25.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:
1. A hinge assembly, comprising:
a pivot shaft;
a rotatable leaf rotatably sleeved on the pivot shaft;
a fixing leaf non-rotatably sleeved on the pivot shaft;
a first magnet fixed to the rotatable leaf;

a second magnet fixed to the fixing leaf, wherein a polarity of the second magnet faces an opposite polarity of the first magnet in a predetermined position such that the first and second magnets creating attraction, and the attracting force is changeable when the rotatable leaf is rotated relative to the fixing leaf; and a fixing member fixed at an end of pivot shaft to prevent the rotatable leaf and the fixing leaf from detaching from the pivot shaft.

2. The hinge assembly of claim 1, wherein the first magnet comprises a base portion and a fixing portion extending from an end thereof; and the rotatable leaf defines a fixing hole therein, in which the fixing portion is tightly engaged.

3. The hinge assembly of claim 2, wherein the base portion and the fixing portion are both substantially cylindrical, and a diameter of the fixing portion is less than a diameter of the base portion.

4. The hinge assembly of claim 1, wherein the second magnet comprises a base portion and a fixing portion extending from an end thereof; and the fixing leaf defines a fixing hole therein, in which the fixing portion is tightly engaged.

5. The hinge assembly of claim 4, wherein the base portion and the fixing portion are both substantially cylindrical, and a diameter of the fixing portion is less than a diameter of the base portion.

6. The hinge assembly of claim 1, further comprising a pair of resilient members rotatably sleeved on the pivot shaft adjacent to the fixing leaf; the resilient members providing an axial force between the fixing leaf and the rotatable leaf.

7. The hinge assembly of claim 6, wherein the resilient members are substantially annular, and a middle portion of each resilient member protrudes toward one side thereof.

8. The hinge assembly of claim 7, further comprising two friction members sleeved on the pivot shaft, and positioned between the rotatable leaf and the fixing leaf.

9. The hinge assembly of claim 8, further comprising a washer sleeved on the pivot shaft, abutted by the fastening member.

10. The hinge assembly of claim 9, wherein the fastening member comprises a friction portion abutting and preventing the washer from loosening on the pivot shaft.

11. The hinge assembly of claim 8, wherein the pivot shaft comprises a substantially cylindrical shaft portion, a limiting portion extending from a first end of the shaft portion, and a flange portion extending from a second end of the shaft portion; wherein the rotatable leaf defines a pivot hole to engage the shaft portion; the fixing leaf defines a deformed hole to engage the limiting portion; the flange portion abuts the rotatable leaf; and the fixing member is fixed at a distal end of the limiting portion away from the flange portion.

12. The hinge assembly of claim 11, wherein the rotatable leaf comprises a mounting portion and a supporting portion extending substantially perpendicularly from a side of the mounting portion; wherein the pivot hole is defined in a middle portion of an end of the supporting portion away from the mounting portion; and the shaft portion extends through the pivot hole and the flange portion abuts the mounting portion.

13. The hinge assembly of claim 11, wherein the fixing leaf comprises a mounting portion and a connecting plate extending substantially perpendicularly from a side thereof; the deformed hole is defined in a middle portion of an end of the connecting plate away from the mounting portion; and the limiting portion is non-rotatably engaged in the deformed hole.

14. The hinge assembly of claim 11, wherein the pivot shaft further comprises a threaded portion formed on the distal end of the limiting portion; and the fastening member is a nut defining a threaded hole to engage the threaded portion.

15. A hinge assembly, comprising:
a pivot shaft;
a rotatable leaf comprising a mounting portion and a supporting portion extending substantially perpendicularly from a side thereof, the supporting portion defining a pivot hole such that the rotatable leaf is rotatably sleeved on the pivot shaft via the pivot hole;
a fixing leaf comprising a mounting portion and a connecting plate extending substantially perpendicularly from a side thereof, the connecting plate defining a deformed hole such that the fixing leaf the pivot hole is non-rotatably sleeved on the pivot shaft;
a pair of first magnets fixed to the supporting portion adjacent opposite sides of the pivot hole of the rotatable leaf; and
a second magnet fixed to the fixing leaf, wherein a polarity of the second magnet faces an opposite polarity of one of the first magnets in a first position, the polarity of the second magnet faces an opposite polarity of the other one of the first magnets in a second position, and attraction between the first and second magnets is changeable when the rotatable leaf is rotated relative to the fixing leaf.

16. The hinge assembly of claim 15, wherein each first magnet comprises a base portion and a fixing portion extending from an end thereof; the supporting portion of the rotatable leaf defines two fixing holes on opposite sides of the pivot hole; and the fixing portion of each first magnet is tightly engaged in each fixing hole.

17. The hinge assembly of claim 15, wherein the second magnet comprises a base portion and a fixing portion extending from an end thereof; and the connecting plate of the fixing leaf defines a fixing hole therein, in which the fixing portion is tightly engaged.

18. The hinge assembly of claim 15, further comprising a pair of resilient members rotatably sleeved on the pivot shaft adjacent to the fixing leaf; the resilient members providing an axial force between the fixing leaf and the rotatable leaf.

19. The hinge assembly of claim 15, further comprising two friction members sleeved on the pivot shaft and positioned between the supporting portion of the rotatable leaf and the connecting plate of the fixing leaf.

20. The hinge assembly of claim 15, further comprising a washer sleeved on the pivot shaft, and the fastening member abuts the washer; wherein the fastening member comprises a friction portion abutting the washer to prevent loosening thereof on the pivot shaft.

* * * * *